(12) United States Patent
McIntyre et al.

(10) Patent No.: US 11,219,976 B2
(45) Date of Patent: Jan. 11, 2022

(54) MANUFACTURING METHOD FOR CYLINDRICAL PARTS

(71) Applicant: GKN AEROSPACE NEWINGTON LLC, Newington, CT (US)

(72) Inventors: Gunnar Sterling McIntyre, Newington, CT (US); Hans Pär-Eric Viklund, Newington, CT (US); Jan Andreas Andersson, Newington, CT (US)

(73) Assignee: GKN Aerospace Newington LLC, Newington, CT (US)

( * ) Notice: Subject to any disclaimer, the term of this patent is extended or adjusted under 35 U.S.C. 154(b) by 284 days.

(21) Appl. No.: 16/336,914

(22) PCT Filed: Sep. 29, 2016

(86) PCT No.: PCT/US2016/054356
§ 371 (c)(1),
(2) Date: Mar. 27, 2019

(87) PCT Pub. No.: WO2018/063221
PCT Pub. Date: Apr. 5, 2018

(65) Prior Publication Data
US 2020/0030926 A1    Jan. 30, 2020

(51) Int. Cl.
*B23P 23/04* (2006.01)
*B33Y 80/00* (2015.01)
(Continued)

(52) U.S. Cl.
CPC ........... *B23P 23/04* (2013.01); *B21J 5/025* (2013.01); *B23K 31/027* (2013.01); *B33Y 80/00* (2014.12);
(Continued)

(58) Field of Classification Search
CPC .... B23K 26/206; B23K 26/34; B23K 26/342; Y10T 29/49728; Y10T 29/49726;
(Continued)

(56) References Cited

U.S. PATENT DOCUMENTS 4,161,056 A * 7/1979 Dunham ................... B23P 6/00
156/94
4,699,212 A  10/1987 Andersson et al.
(Continued)

OTHER PUBLICATIONS

International Search Report and Written Opinion for PCT/US2016/054356 dated Jun. 26, 2017 (11 pages).

*Primary Examiner* — Jason L Vaughan
(74) *Attorney, Agent, or Firm* — Bejin Bieneman PLC

(57) ABSTRACT

A method includes mounting a hollow cylinder on a turntable, positioning an additive-manufacturing deposition tool at a surface of the hollow cylinder, and rotating the hollow cylinder on the turntable while depositing material on the hollow cylinder with the deposition tool. Further, a method includes making an opening in a wall of the hollow cylinder, forming a part to fit in the opening, and welding the part to the hollow cylinder such that the part fills the opening. The hollow cylinder has an inner radius and an outer radius, and the part is formed with an inner radius of curvature and an outer radius of curvature substantially similar to the inner radius and outer radius, respectively, of the hollow cylinder when the part is positioned in the opening.

14 Claims, 10 Drawing Sheets

(51) Int. Cl.
  *B21J 5/02* (2006.01)
  *B23K 31/02* (2006.01)
  *F01D 25/24* (2006.01)

(52) U.S. Cl.
  CPC ...... *F01D 25/243* (2013.01); *F05D 2220/323* (2013.01); *F05D 2230/31* (2013.01)

(58) Field of Classification Search
  CPC ......... Y10T 29/49732; Y10T 29/49734; Y10T 29/49737
  See application file for complete search history.

(56) References Cited

U.S. PATENT DOCUMENTS

| | | | | |
|---|---|---|---|---|
| 4,801,055 A * | 1/1989 | Muschner | ............. | B22D 41/28 222/590 |
| 5,023,987 A * | 6/1991 | Wuepper | ............. | B23P 6/00 156/98 |
| 5,855,149 A * | 1/1999 | Islam | ............. | C23C 24/10 76/107.8 |
| 6,345,441 B1 * | 2/2002 | Farmer | ............. | B23P 6/005 29/402.13 |
| 6,413,650 B1 * | 7/2002 | Dupree | ............. | B23P 6/005 428/577 |
| 6,925,810 B2 * | 8/2005 | Swaffar | ............. | F01D 9/023 60/752 |
| 7,546,684 B2 * | 6/2009 | Caldwell | ............. | B23P 6/005 29/889.1 |
| 7,552,855 B2 * | 6/2009 | Vargas | ............. | B23K 33/004 228/119 |
| 8,312,627 B2 * | 11/2012 | Emilianowicz | ......... | B23P 6/005 29/889.1 |
| 8,895,887 B2 * | 11/2014 | Trapp | ............. | B23P 6/007 219/78.01 |
| 2002/0020164 A1 | 2/2002 | Cleveland et al. | | |
| 2011/0058313 A1 | 3/2011 | Hausler et al. | | |
| 2014/0053562 A1 | 2/2014 | Mohr et al. | | |
| 2014/0124483 A1 | 5/2014 | Henn | | |
| 2017/0209958 A1 * | 7/2017 | Soshi | ............. | B22F 5/106 |
| 2018/0112167 A1 * | 4/2018 | Kang | ............. | B29C 64/321 |

\* cited by examiner

MANUFACTURING METHOD FOR CYLINDRICAL PARTS

CROSS-REFERENCE TO RELATED APPLICATIONS

This application is a national stage of, and claims priority to, Patent Cooperation Treaty Application No. PCT/US2016/054356, filed on Sep. 29, 2016, which application is hereby incorporated herein by reference in its entirety.

BACKGROUND

Aerospace manufacturing regularly produces cylindrical parts. To manufacture the cylindrical parts, a manufacturer begins with a cylindrical stock part having an outside diameter at least as wide as the widest feature on the finished part and an inside diameter at most as wide as the narrowest feature on the finished part. In other words, the stock part encompasses an envelope of the finished part. The manufacturer then removes material from the stock part by machining until it matches the finished part. Machining away material often turns the material into chips or shavings, preventing reuse of the material. Current manufacturing processes can generate large amounts of waste material, i.e., large portions of stock parts go unused and are discarded.

SUMMARY

A method includes mounting a hollow cylinder on a turntable, positioning an additive-manufacturing deposition tool at a surface of the hollow cylinder, and rotating the hollow cylinder on the turntable while depositing material on the hollow cylinder with the deposition tool.

For the method, positioning may include positioning the additive-manufacturing deposition tool at top dead center of the hollow cylinder (when depositing material on an outer surface of the cylinder) or bottom dead center (when depositing material on an inner surface of the cylinder).

The method may include forging and rolling a workpiece into the hollow cylinder.

For the method, rotating may include rotating the hollow cylinder at least 360 degrees.

For the method, the material deposited while rotating the cylinder may form one of a flange and a rib.

For the method, the surface of the hollow cylinder may be one of an interior and an exterior surface.

The method may include machining the material deposited by the deposition tool.

For the method, the hollow cylinder and the material deposited may be formed of metal.

For the method, an outer diameter of the hollow cylinder may be between 15 and 150 inches.

A method includes making an opening in a wall of a hollow cylinder, forming a part to fit in the opening, and welding the part to the hollow cylinder such that the part fills the opening. The hollow cylinder has an inner radius and an outer radius. The part has an inner radius of curvature and an outer radius of curvature substantially similar to the inner radius and outer radius, respectively, of the hollow cylinder when the part is positioned in the opening.

For the method, forming the part may include forming the part by closed-die forging.

For the method, the part may have a feature extending outside one of the inner radius of curvature and the outer radius of curvature.

The method may include forging and rolling a workpiece into the hollow cylinder.

For the method, the opening may lack corners.

For the method, the hollow cylinder and the part may be formed of metal.

For the method, the outer radius of the hollow cylinder may be between 25 and 60 inches.

DETAILED DESCRIPTION

Figure 1:
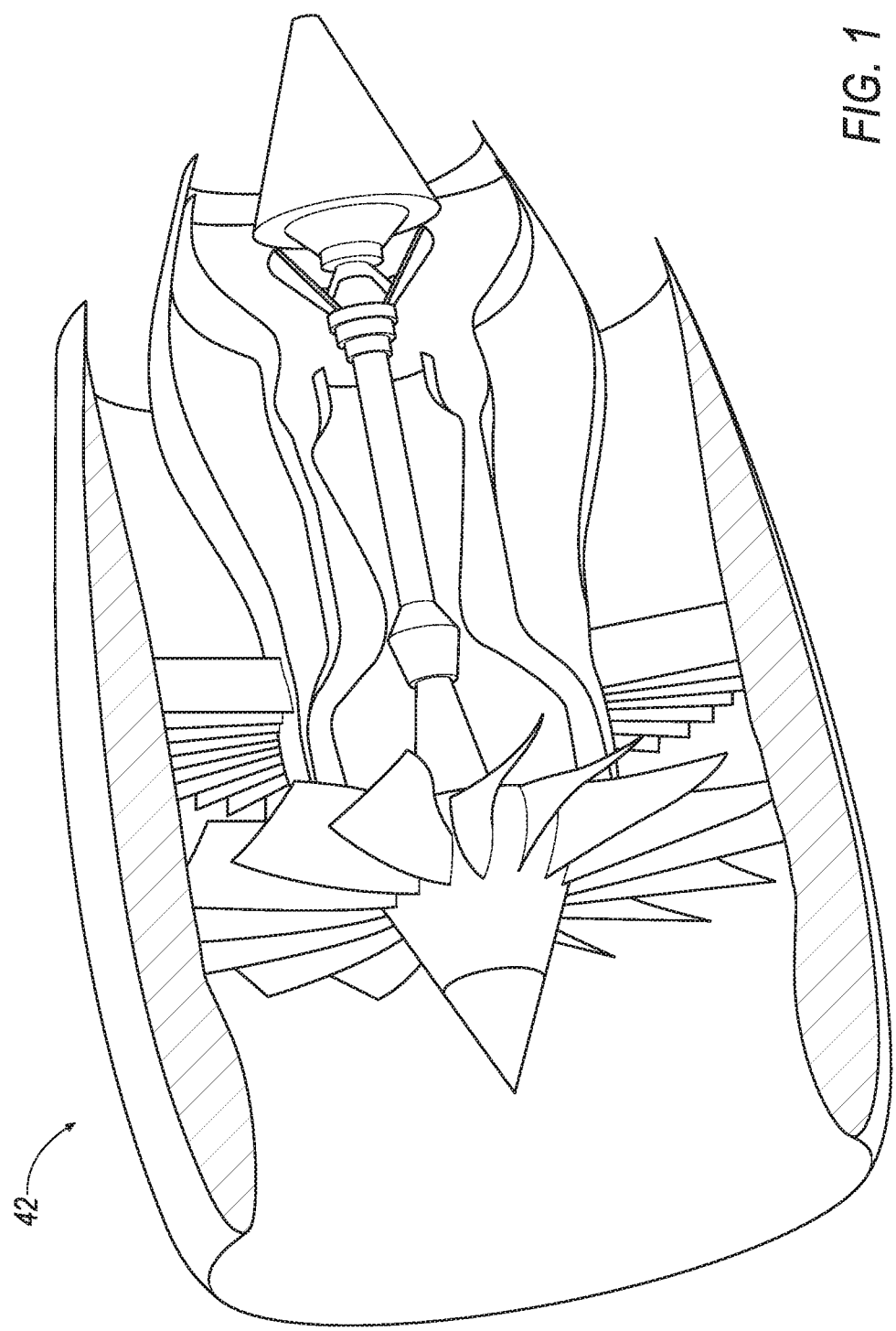
FIG. 1 is a perspective, exposed view of a gas turbine engine.

With reference to the Figures, wherein like numerals indicate like parts throughout the several views, a method includes mounting a hollow cylinder 30 on a turntable 32, positioning an additive-manufacturing deposition tool 34 at a surface 44, 46 of the hollow cylinder 30, and rotating the hollow cylinder 30 on the turntable 32 while depositing material 58 on the hollow cylinder 30 with the deposition tool 34. Further, a method includes making an opening 36 in a wall 38 of the hollow cylinder 30, forming a part 40 to fit in the opening 36, and welding the part 40 to the hollow cylinder 30 such that the part 40 fills the opening 36. The hollow cylinder 30 has an inner radius r and an outer radius R, and the part 40 is formed with an inner radius of curvature and an outer radius of curvature substantially similar to the inner radius r and outer radius R, respectively, of the hollow cylinder 30 when the part 40 is positioned in the opening 36.

Disclosed techniques reduce waste of material by reducing how much material must be machined away to create a finished part. These techniques also reduce labor time for making each finished part. Thus, costs are advantageously reduced by reducing material costs and labor costs.

Large, cylindrical, metal parts are regularly used in the aerospace industry. For example, FIG. 1 shows a gas turbine or turbojet engine 42 for an airplane, which includes several such parts. Turbines like the gas turbine engine 42 in FIG. 1 can be from about 40 to about 130 inches in diameter.

Figure 3:
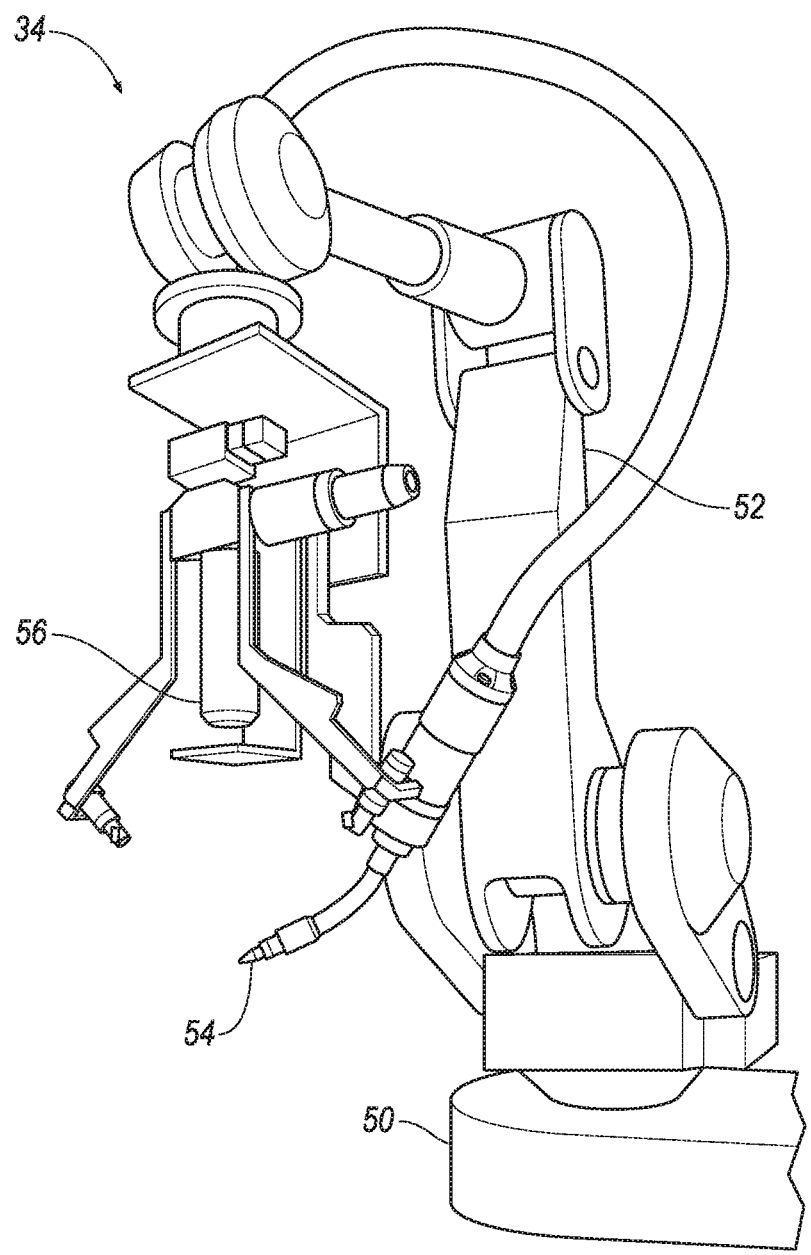
FIG. 3 is a perspective view of an additive-manufacturing deposition tool.

An example of the additive-manufacturing deposition tool 34 is shown in FIG. 3. As shown in FIG. 3, the deposition tool 34 is used for laser metal deposition-wire (LMD-w). The deposition tool 34 may include a base 50, an arm 52 supported by the base 50, and the nozzle 54 and the laser 56 supported by the arm 52. In operation, the nozzle 54 feeds a wire, and the laser 56 heats a target point at an end of the wire to a temperature above a melting point of the wire.

Additive manufacturing is a process of manufacturing parts by successively depositing material 58 in layers. The deposition tool 34 may deposit material 58 in an already molten state, or the deposition tool 34 may melt material 58 as it is being deposited. An example of depositing molten material 58 is fused deposition modeling, which involves extruding, from a nozzle 54, a bead of material 58 that immediately hardens. Two examples of melting a solid material 58 include (LMD-w), which uses a laser 56 to melt a continuously fed wire; and powder-fed directed energy deposition, which uses a laser to melt a metal powder that is being continuously fed. Other types of additive manufacturing use powder beds rather than continuously feeding powder.

Figure 2:
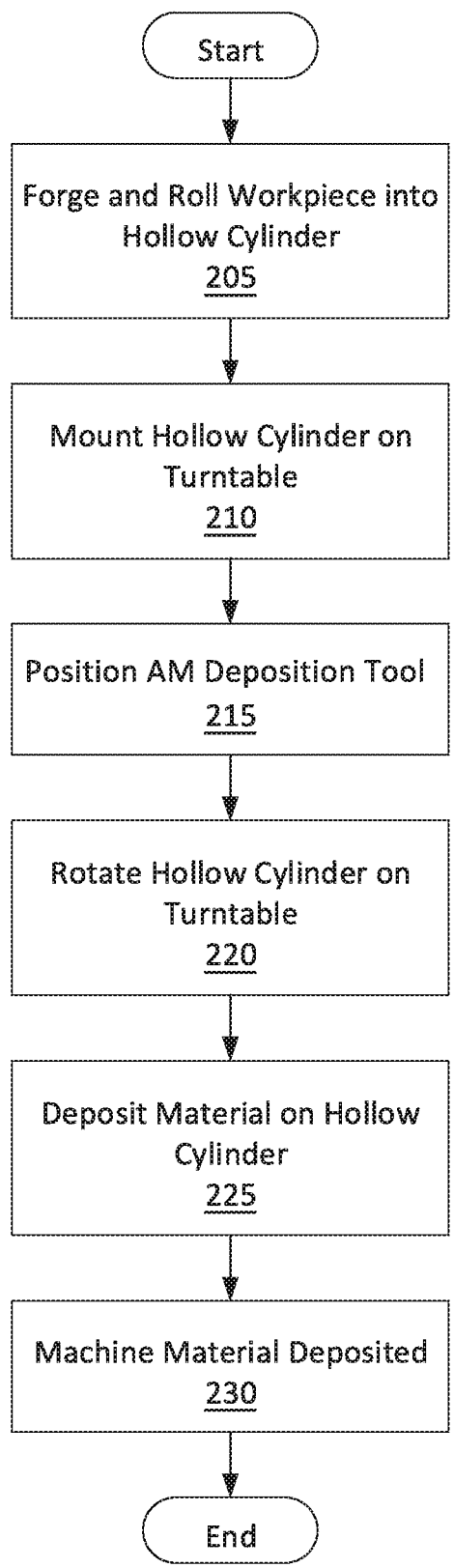
FIG. 2 is a process flow diagram of a process for manufacturing a cylindrical part.

FIG. 2 is a process flow diagram illustrating an exemplary process 200 for manufacturing a cylindrical part. The process 200 begins in a block 205. A workpiece is forged and rolled into the hollow cylinder 30. Specifically, forging is used to form a workpiece into a cylindrical shape, as is known. Then ring rolling is performed. Ring rolling is a form of hot rolling that increases an outer diameter D while reducing a thickness of the hollow cylinder 30 by running the wall 38 of the hollow cylinder 30 between two rollers while a temperature of the hollow cylinder 30 is above a recrystallization temperature of a metal of the hollow cylinder 30. Upon completion of forging and rolling, the outer diameter D of the hollow cylinder 30 is between 15 and 150 inches. As a result of the ring rolling, the grain structure of the hollow cylinder 30 becomes circumferential.

Figure 4:
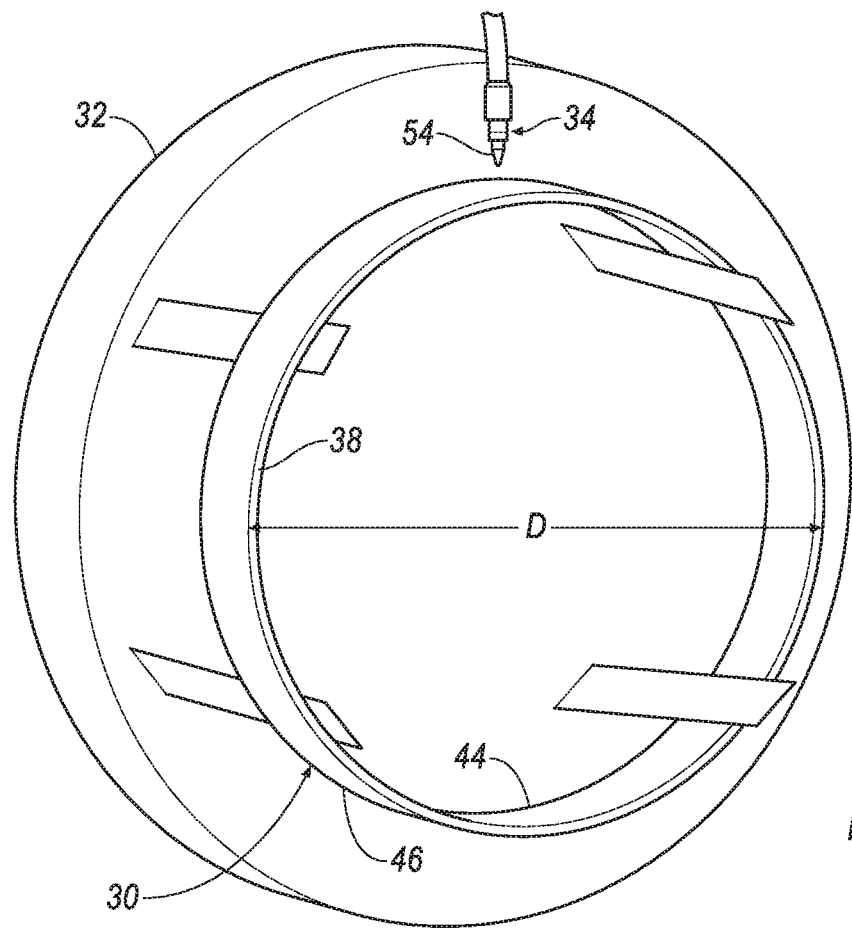
FIG. 4 is a perspective view of a hollow cylinder on a turntable with an end of the additive-manufacturing deposition tool.

Next, in a block 210, the hollow cylinder 30 is mounted on the turntable 32. As shown in FIG. 4, the turntable 32 supports the hollow cylinder 30. The hollow cylinder 30 may be oriented upright, so that an axis directed through a center of the hollow cylinder 30 is oriented horizontally.

Figure 5:
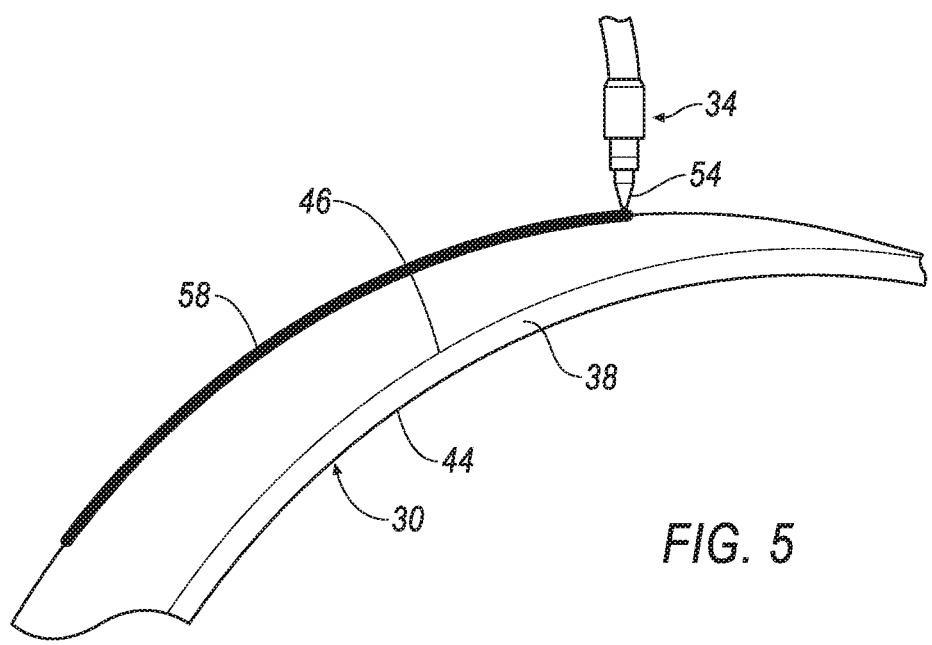
FIG. 5 is a perspective view of the additive-manufacturing deposition tool depositing material on a portion of the hollow cylinder.

Next, in a block 215, the additive-manufacturing deposition tool 34 is positioned at the surface 44, 46 of the hollow cylinder 30. The surface 44, 46 may be one of an interior surface 44 and an exterior surface 46. For example, for a feature 60, 62, 64, 66 on the exterior surface 46 of the hollow cylinder 30, the deposition tool 34 may be positioned at top dead center, that is, an uppermost position on a circular path, of the hollow cylinder 30, as shown in FIGS. 4 and 5. For another example, for a feature 60, 62, 64, 66 on the interior surface 44, the deposition tool 34 may be positioned at bottom dead center (not shown), that is, a lowermost position on a circular path.

Figure 6:
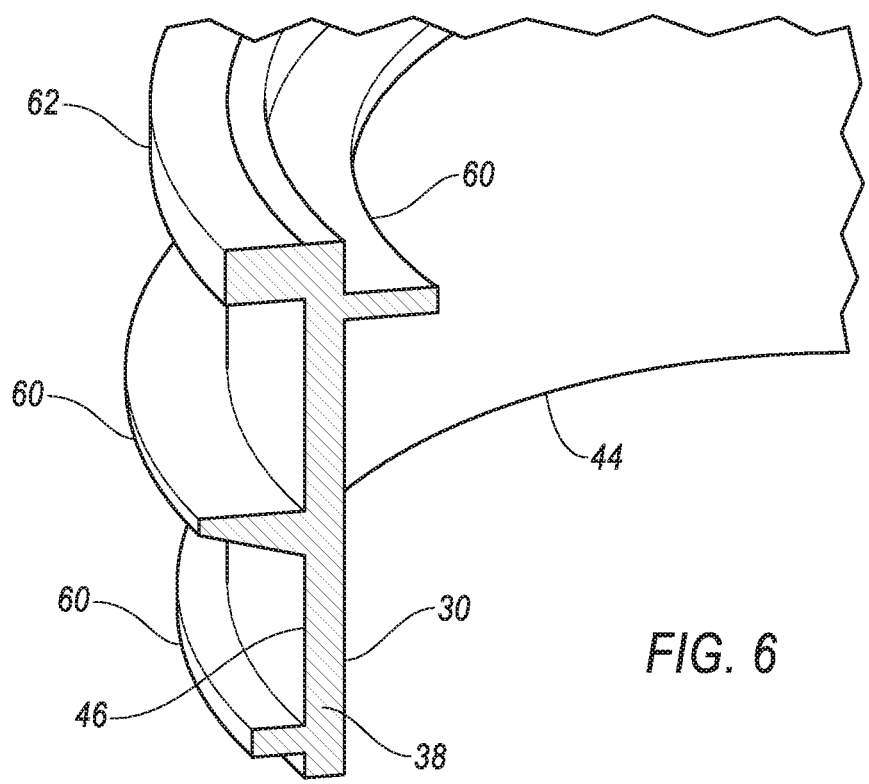
FIG. 6 is a perspective, cutaway view of the hollow cylinder with material deposited.

Next, in a block 220, the hollow cylinder 30 is rotated on the turntable 32. For a feature 60, 62, 64, 66 extending about a circumference of the hollow cylinder 30, as shown in FIG. 6, the hollow cylinder 30 may be rotated at least 360°.

Figure 7:
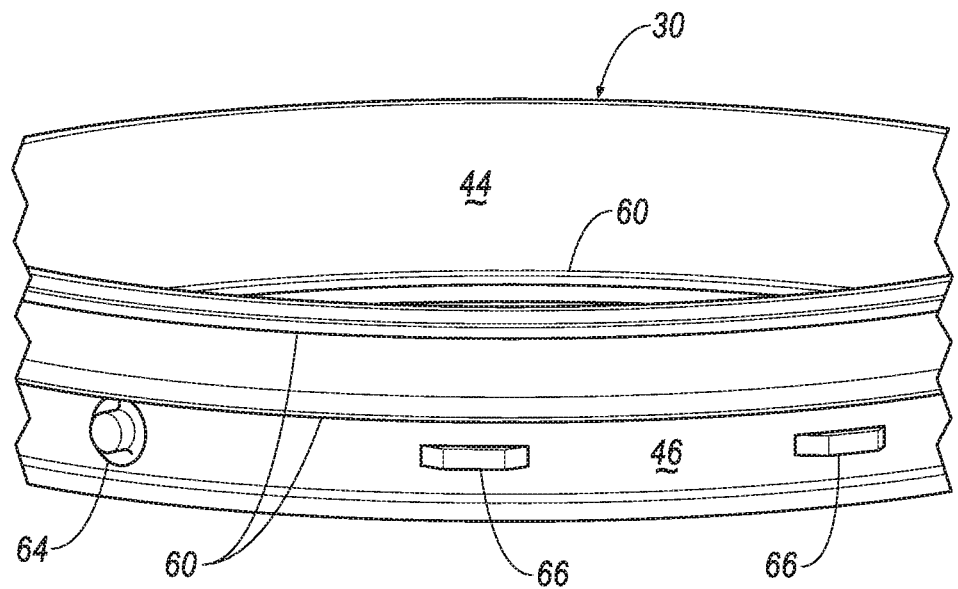
FIG. 7 is a perspective view of the hollow cylinder with material deposited.
Figure 8:
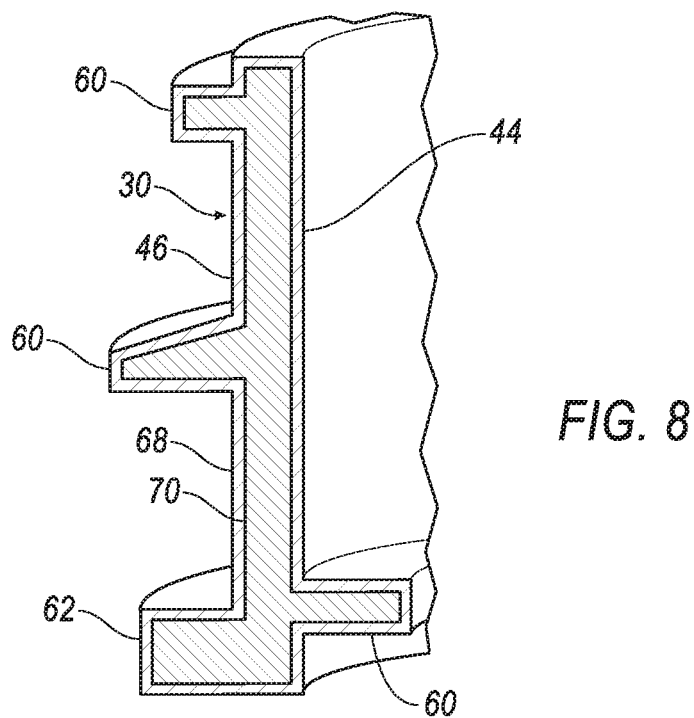
FIG. 8 is a cross-sectional view of the hollow cylinder with material deposited.

Next, in a block 225, while rotating the hollow cylinder 30 on the turntable 32, material 58 is deposited on the cylinder with the deposition tool 34, as shown in FIG. 5. The rotation of the turntable 32 allows the deposition tool 34 to remain at top or bottom dead center during deposition. The deposition tool 34 may move or remain stationary. The material 58 deposited on the hollow cylinder 30 forms the feature 60, 62, 64, 66. Examples of features 60, 62, 64, 66 include ribs 60 and flanges 62 as shown in FIGS. 6 and 7, and bosses 64 and tabs 66 as shown in FIG. 8. The features 60, 62, 64, 66 may be located on the interior surface 44 or the exterior surface 46.

Next, in a block 230, the material 58 deposited by the deposition tool 34 is machined. Specifically, the manufacturer cuts away material from the material 58 deposited and/or the hollow cylinder 30. FIG. 8 shows removed material 68 and remaining material 70. The techniques allow substantially less material to be machined away, for example, approximately 35% rather than approximately 80%. The hollow cylinder 30 and the material 58 deposited may be formed of metal and may be formed of the same material. After the block 230, the process 200 ends.

Figure 9:
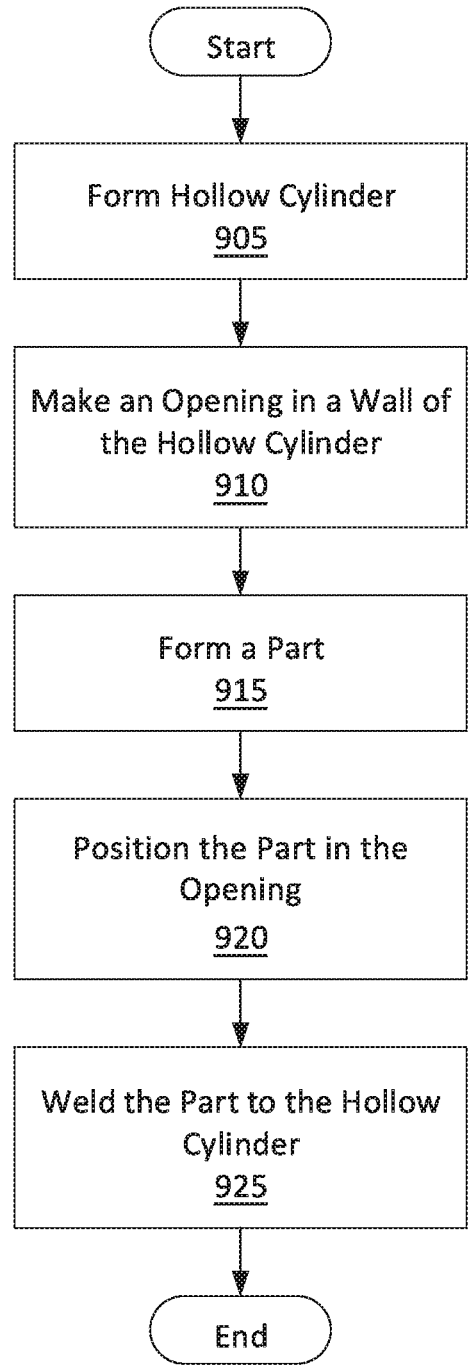
FIG. 9 is a process flow diagram of a second process for manufacturing a cylindrical part.

FIG. 9 is a process flow diagram illustrating another exemplary process 900 for manufacturing a cylindrical part. The process 900 begins in a block 905. A workpiece is forged and rolled into the hollow cylinder 30, as described above with respect to the block 205. The hollow cylinder 30 has the inner radius r and the outer radius R. Upon completion, the outer radius R of the hollow cylinder 30 is between 25 and 60 inches.

Figure 10:
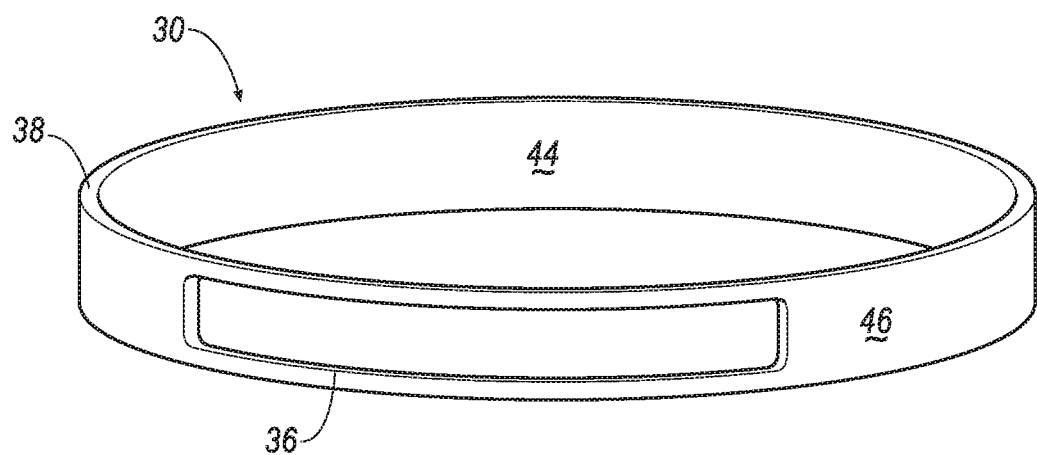
FIG. 10 is a perspective view of the hollow cylinder with an opening made.

Next, in a block 910, the opening 36 is made in the wall 38 of the hollow cylinder 30, as shown in FIG. 10. The opening 36 can be made with any suitable subtractive manufacturing process, e.g., milling, drilling, reaming, sawing, laser or water-jet cutting, routing, grinding, etc. The opening 36 lacks corners; thus, during the welding step described below with respect to a block 920, the welding can occur continuously around the opening 36 without starting or stopping or sudden direction changes, i.e., for purposes of this disclosure a "corner" means a turn or change of direction of sufficient sharpness to prevent a continuous weld.

Figure 11:
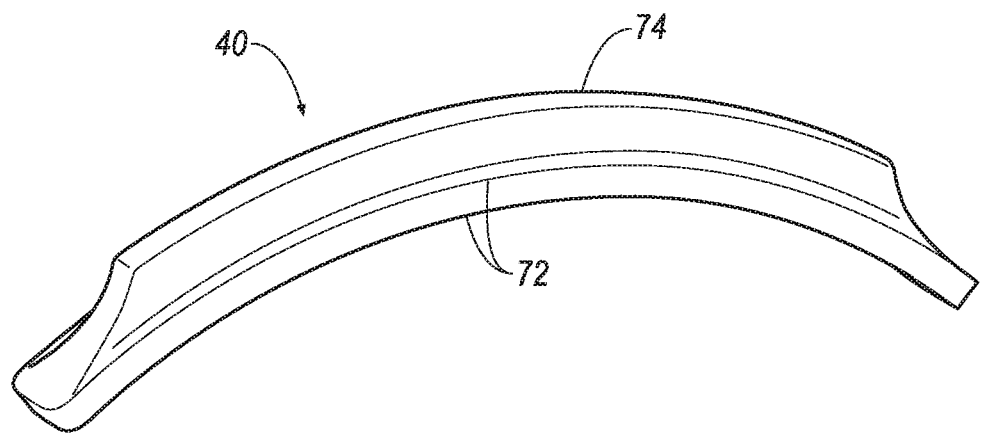
FIG. 11 is a perspective view of a part.
Figure 12:
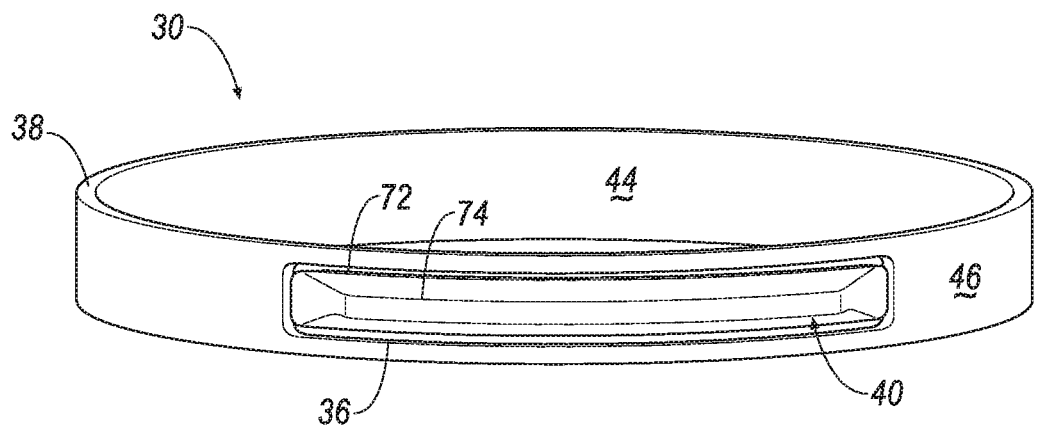
FIG. 12 is a perspective view of the hollow cylinder with the part positioned in the opening.
Figure 13:
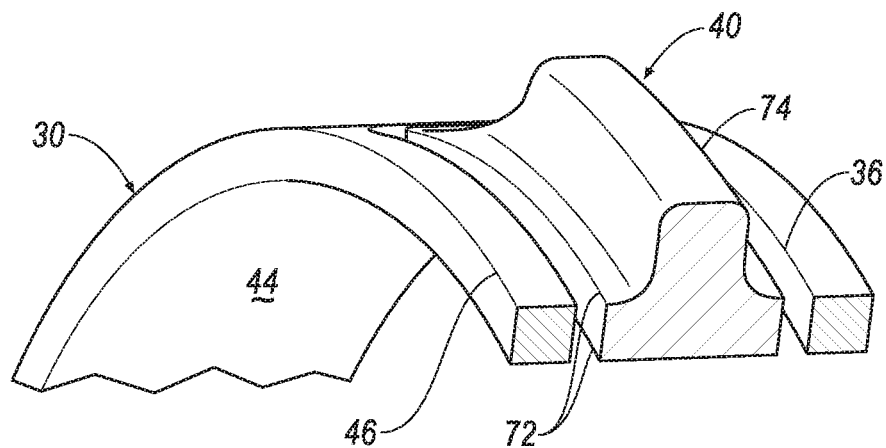
FIG. 13 is a perspective, cutaway view of the hollow cylinder with the part positioned in the opening.
Figure 15:
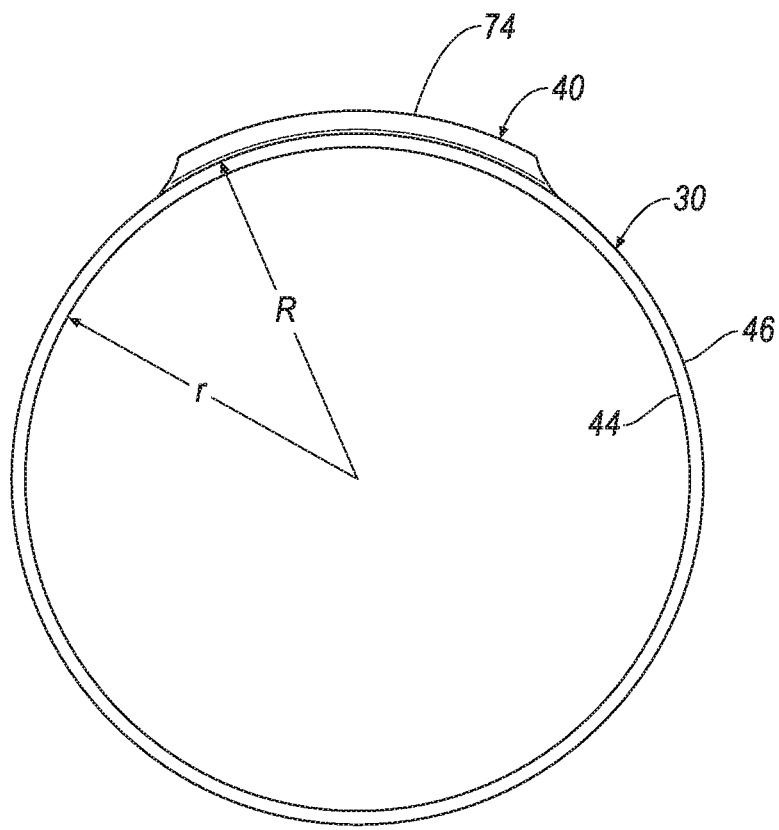
FIG. 15 is a top view of the hollow cylinder with the part welded in the opening.

Next, in a block 915, the part 40 is formed, e.g., as shown in FIG. 11, to fit in the opening 36 with an inner radius of curvature and an outer radius of curvature substantially similar to the inner radius r and the outer radius R, respectively, of the hollow cylinder 30 when the part 40 is positioned in the opening 36, as shown in FIG. 12. In other words, when the part 40 is positioned in the opening 36, edges 72 of the part 40 curve alongside the wall 38 of the hollow cylinder 30, as shown in FIG. 13. As shown in FIG. 15, the part 40 may have a feature 74 extending outside one of the inner radius of curvature and the outer radius of curvature. In other words, when the part 40 is positioned in the opening 36, the feature 74 extends one of farther toward the center of the hollow cylinder 30 than the inner radius of curvature and farther away from the center than the outer radius of curvature. Yet further, it can be said that when the part 40 is positioned in the opening 36, the feature 74 extends outside of a space occupied by the wall 38 before making the opening 36 in the wall 38, as described in the block 910. The part 40 may be formed by, e.g., closed-die forging or any other manufacturing process having satisfactory tolerances and material properties.

Next, in a block 920, the part 40 is positioned in the opening 36, as shown in FIGS. 12 and 13.

Figure 14:
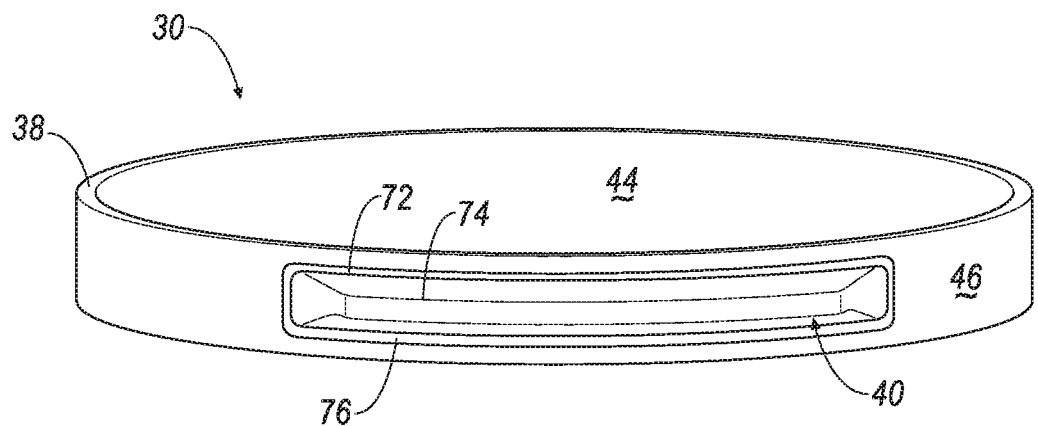
FIG. 14 is a perspective view of the hollow cylinder with the part welded in the opening.

Next, in a block 925, the part 40 is welded to the hollow cylinder 30 such that the part 40 fills the opening 36, as shown in FIG. 14. The welding connects the hollow cylinder 30 and the part 40 with a weld 76. The part 40 can be joined to the hollow cylinder 30 with any suitable welding process, e.g., laser welding, shielded metal arc welding, gas tungsten arc welding, gas metal arc welding, flux-cored arc welding, submerged arc welding, electroslag welding, etc. After the block 925, the process 900 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:
   making an opening in a wall of a hollow cylinder, the hollow cylinder having an inner radius and an outer radius;
   forming a part to fit in the opening with an inner radius of curvature and an outer radius of curvature substantially similar to the inner radius and outer radius, respectively, of the hollow cylinder when the part is positioned in the opening;
   welding the part to the hollow cylinder such that the part fills the opening;
   mounting the hollow cylinder on a turntable;
   positioning an additive-manufacturing deposition tool at a surface of the hollow cylinder; and
   rotating the hollow cylinder on the turntable while depositing material on the hollow cylinder with the deposition tool;
   wherein the part has a feature extending outside one of the inner radius of curvature and the outer radius of curvature.

2. The method of claim 1, wherein the positioning step includes positioning the additive-manufacturing deposition tool at top dead center of the hollow cylinder.

3. The method of claim 1, further comprising forging and rolling a workpiece into the hollow cylinder.

4. The method of claim 1, wherein the rotating step includes rotating the hollow cylinder at least 360 degrees.

5. The method of claim 4, wherein the material deposited while rotating the cylinder forms one of a flange and a rib.

6. The method of claim 1, wherein the surface of the hollow cylinder is one of an interior and an exterior surface.

7. The method of claim 1, further comprising machining the material deposited by the deposition tool.

8. The method of claim 1, wherein the hollow cylinder and the material deposited are formed of metal.

9. The method of claim 1, wherein an outer diameter of the hollow cylinder is between 15 and 150 inches.

10. The method of claim 1, wherein forming the part includes forming the part by closed-die forging.

11. The method of claim 1, wherein the opening lacks corners.

12. The method of claim 1, wherein the hollow cylinder and the part are formed of metal.

13. The method of claim 1, wherein the outer radius of the hollow cylinder is between 25 and 60 inches.

14. A method comprising:
    making an opening in a wall of a hollow cylinder, the hollow cylinder having an inner radius and an outer radius;
    forming a part to fit in the opening with an inner radius of curvature and an outer radius of curvature substantially similar to the inner radius and outer radius, respectively, of the hollow cylinder when the part is positioned in the opening, wherein forming the part includes forming the part by closed-die forging;
    welding the part to the hollow cylinder such that the part fills the opening;
    mounting the hollow cylinder on a turntable;
    positioning an additive-manufacturing deposition tool at a surface of the hollow cylinder; and
    rotating the hollow cylinder on the turntable while depositing material on the hollow cylinder with the deposition tool.

* * * * *